United States Patent
Szwerinski et al.

(10) Patent No.: US 8,023,985 B1
(45) Date of Patent: Sep. 20, 2011

(54) TRANSITIONING A STATE OF A CONNECTION IN RESPONSE TO AN INDICATION THAT A WIRELESS LINK TO A WIRELESS DEVICE HAS BEEN LOST

(75) Inventors: Helge Szwerinski, Cupertino, CA (US); Nicolas S Dade, Santa Cruz, CA (US); Vibhu Vivek, Fremont, CA (US); Kumara Das Karunakaran, Santa Clara, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1374 days.

(21) Appl. No.: 10/862,514

(22) Filed: Jun. 7, 2004

(51) Int. Cl.
 *H04B 7/00* (2006.01)
 *H04B 1/00* (2006.01)
(52) U.S. Cl. ....... 455/522; 455/69; 455/435.1; 455/515; 455/434; 455/401
(58) Field of Classification Search .................. 455/567, 455/574, 435.1, 435.2, 435, 522, 515, 434, 455/401, 464; 709/232, 231, 250, 238, 224, 709/245, 239; 370/242, 437, 282, 349, 418, 370/239
See application file for complete search history.

(56) References Cited

U.S. PATENT DOCUMENTS

| 6,208,620 | B1 * | 3/2001 | Sen et al. | 370/231 |
| 6,473,419 | B1 * | 10/2002 | Gray et al. | 370/349 |
| 6,880,013 | B2 * | 4/2005 | Kashyap | 709/227 |
| 7,575,208 | B2 * | 8/2009 | Lan | 248/205.3 |
| 2002/0087698 | A1 * | 7/2002 | Wilson | 709/227 |
| 2003/0236905 | A1 * | 12/2003 | Choi et al. | 709/231 |
| 2004/0044796 | A1 * | 3/2004 | Vangal et al. | 709/250 |
| 2005/0198379 | A1 * | 9/2005 | Panasyuk et al. | 709/239 |
| 2005/0249123 | A1 * | 11/2005 | Finn | 370/242 |

OTHER PUBLICATIONS

U.S. Appl. No. 10/791,414, filed Mar. 3, 2004, and entitled "Technique for Maintaining Secure Network Connections," pp. 1-24, Figs. 1-6.
J. Case et al., "A Simple Network Management Protocol," RFC: 1067, pp. 1-31 (Aug. 1988).
R. Droms, "Dynamic Host Configuration Protocol," RFC: 2131, pp. 1-43 (Mar. 1997).
S. Deering et al., "Internet Protocol, Version 6 (IPv6) Specification," pp. 1-37 (Dec. 1998).
Information Sciences Institute, RFC: 791, "Internet Protocol," pp. 1-49 (Sep. 1981).
Information Sciences Institute, RFC: 793, "Transmission Control Protocol," pp. 1-88 (Sep. 1981).

* cited by examiner

*Primary Examiner* — Jinsong Hu
*Assistant Examiner* — Emem Stephen
(74) *Attorney, Agent, or Firm* — Dority & Manning, P.A.

(57) ABSTRACT

A method and apparatus of establishing a connection between a wireless device and a second device includes maintaining a state of the connection between the wireless device and the second device, and receiving an indication that a wireless link to the wireless device has been lost or may be lost. In response to the receiving the indication that the wireless link to the wireless device has been lost or may be lost, the state of the connection is transitioned from a first state to a second state.

24 Claims, 2 Drawing Sheets

TRANSITIONING A STATE OF A CONNECTION IN RESPONSE TO AN INDICATION THAT A WIRELESS LINK TO A WIRELESS DEVICE HAS BEEN LOST

BACKGROUND

Advances in communications technology have enabled for a greater variety of and more convenient communications over data networks. Traditionally, the types of communications over data networks include web browsing, electronic mail, file transfers, and so forth. With the greater bandwidth available on data networks, real-time communications over data networks have also become increasingly popular, including electronic gaming, voice over packet data, streaming communications, and others.

A data network typically includes many components, including network terminals (referred to as clients), servers, routers, firewalls, and other network elements. The data network can include a public network (such as the Internet) and/or private networks (such as local area networks or wide area networks). Traditionally, a network terminal has connected to a data network using a wired connection (such as through a modem and telephone line, wired LAN connection, and the like). An increasingly popular form of connection of a network terminal to a data network is a wireless connection. Various standards have provided for such wireless connections, including wireless Ethernet (defined by the 802.11 standards from the Institute of Electrical and Electronics Engineers or IEEE).

A network protocol that defines packet-based communications over data networks includes the Internet Protocol (IP). One version of IP is IPv4, as described in Request for Comments (RFC) 791, entitled "Internet Protocol," dated September 1981. Another version of IP is IPv6, as described in RFC 2460, entitled "Internet Protocol, Version 6 (IPv6) Specification," dated December 1998. IP provides a network layer that defines packets for communicating data over a data network. Above the network layer is a transport layer to define interconnections between hosts. One example of a transport layer is a Transmission Control Protocol (TCP) layer. TCP is a connection-oriented, end-to-end protocol that provides for reliable inter-process communication between pairs of processes in host computers attached to communication networks.

Stateful intermediate devices, such as firewalls or network-address-translation (NAT) routers, are used in many networks to protect one domain from another domain, typically to protect users in a private network from a public network such as the Internet. A stateful intermediate device maintains states (such as TCP states) of the connection between network terminals. A firewall maintains the TCP state of each connection to protect against malicious use of a connection by unauthorized systems to prevent hacking activity such as port scans, topology mapping, and so forth. Also, maintaining states of a connection enables a firewall or other intermediate device to enforce TCP compliance.

Typically, a stateful intermediate device, such as a firewall, is designed to handle stationary clients in wireline networks. Normally, because of the reliable nature of wired connections, a client in a wireline environment does not lose a link between the client and an access device to a data network. However, in a wireless network, wireless devices may lose network connectivity at a relatively high rate. As a result, a TCP connection that involves a wireless device may become terminated without the graceful handshaking that is performed to terminate a TCP connection. Although the wireless device has lost its wireless link, any stateful intermediate device in the path of the TCP connection may still think that the connection between the wireless device and another endpoint is still established (albeit idle because no data is being exchanged). When the wireless device re-acquires the wireless link, the wireless device may attempt to establish another connection using the original source TCP port. When the new connection requests reaches the stateful intermediate device (which still thinks that the wireless device is associated with the original source TCP port), the stateful intermediate device considers the new connection request as violating TCP, and as a result, drops the connection request. The dropping of the connection request effectively denies access for the wireless device so that the user at the wireless device will not be able to obtain access of the data network until a timeout (usually on the order of 30 minutes to an hour) occurs in the stateful intermediate device to terminate the connection involving the wireless device.

As a result, users of wireless devices may experience unusually long periods of time during which they are unable to access the data network, even though the wireless devices have established wireless links.

SUMMARY

In general, methods and apparatus are provided to enable a wireless device that has lost its wireless link to re-establish a connection through an intermediate device. For example, a method for establishing a connection between a wireless device and a second device includes maintaining a state of the connection between the wireless device and the second device. The method further includes receiving an indication that a wireless link to the wireless device has been lost or may be lost. In response to receiving the indication that the wireless link to the wireless device has been lost or may be lost, the state of the connection is transitioned from a first state to a second state.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
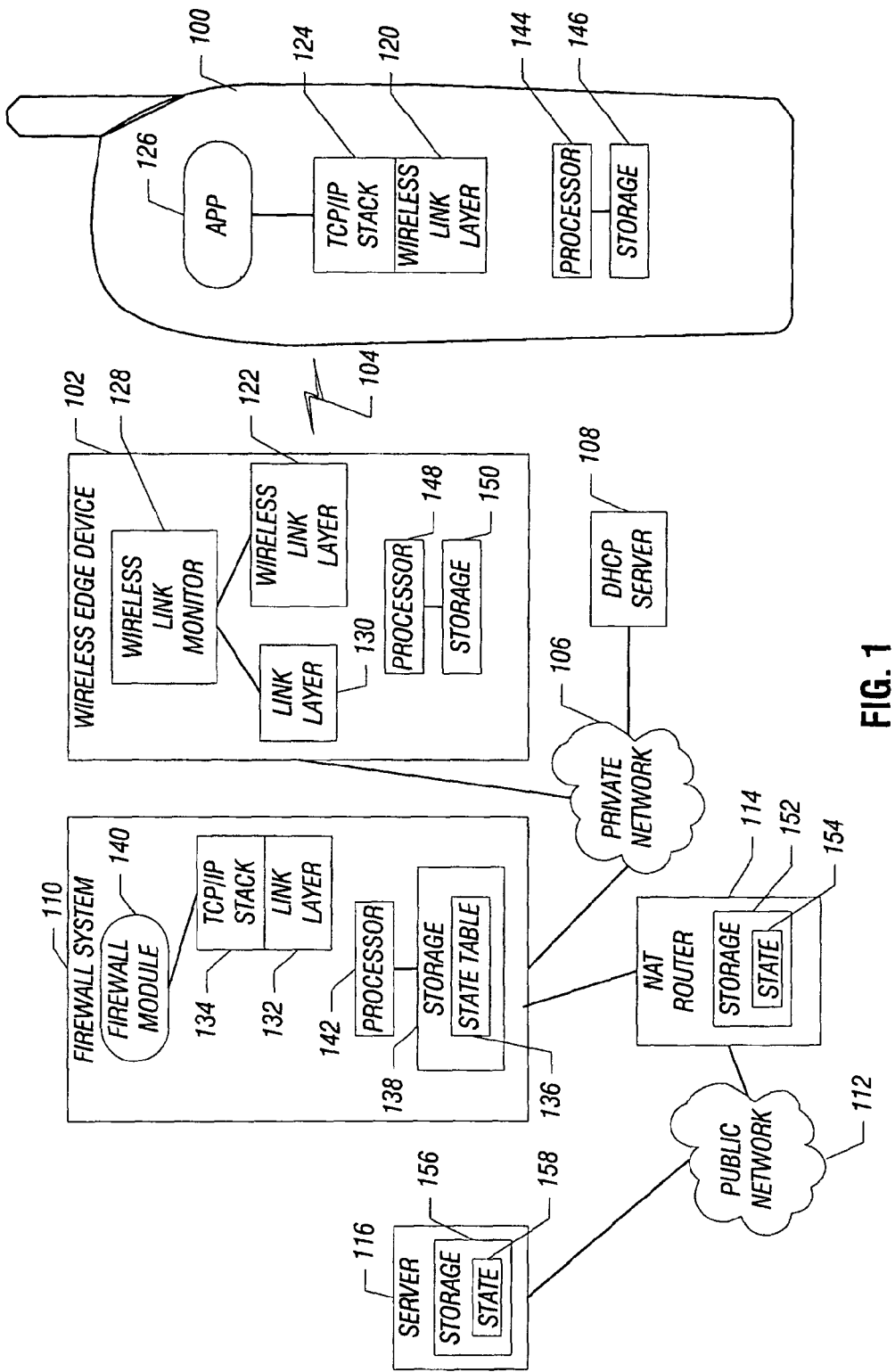
FIG. 1 is a block diagram of a communications network that incorporates an embodiment of the invention.

FIG. 1 illustrates an example arrangement of a communications network that includes a wireless client 100, such as a packet-enabled mobile telephone, a personal digital assistant (PDA), a notebook computer, a tablet computer, a wireless network card, a wireless network peripheral, a wireless appliance, or other wireless devices. The communications network also includes a wireless edge device 102 that communicates with the wireless client 100 over a wireless link 104. The wireless edge device 102 provides access to the rest of the communications network for the wireless client 100, as well as for other wireless devices that are able to communicate with the wireless edge device 102. The wireless edge device 102 is connected to a private network 106 (e.g., a local area network or wide area network), which is in turn connected to a DHCP (Dynamic Host Configuration Protocol) server 108 and a firewall system 110. DHCP is described in RFC 2131, entitled "Dynamics Host Configuration Protocol," dated March 1997. The DHCP server 108 contains configuration information regarding network devices connected to the private network 106. The configuration information includes the Internet Protocol (IP) addresses that can be allocated to the network devices connected to the private network 106. The DHCP server 108 is also capable of delivering other configuration parameters to network devices.

The firewall system 110 is an example of a stateful intermediate device that stores states for communications passing through the firewall system (e.g., between the private network 106 and a public network 112, such as the Internet). A stateful intermediate device tracks the state of each connection between an endpoint on the private network 106 and an endpoint on the public network 112. Examples of states of a connection include a state prior to establishment of a connection and a state after the connection has been established. The firewall system 110 also implements a security policy to prevent unauthorized access of network devices and other resources on the private network 106.

The firewall system 110 is coupled to the public network 112 through a network-address-translation (NAT) router 114. The NAT router 114 performs translations between network addresses (e.g., IP addresses) on the public network 112 and network addresses (e.g., IP addresses) on the private network 106. Effectively, the NAT router 114 enables network devices connected to the private network 106 to use a set of internal network addresses that are hidden from view on the public network side. A benefit of using a NAT router 114 is that more network addresses are available on the private network 106. For example, an enterprise that the private network is associated with may be assigned a limited set of public network addresses. The limited set of public network addresses can be mapped to a larger set of internal network addresses on the private network 106 so that a larger number of network devices can be used behind the NAT router 114.

The NAT router 114 is also a stateful intermediate device that maintains a state of a connection between an endpoint coupled to the private network 106 and another endpoint coupled to the public network 112. For example, the wireless client 100 (an endpoint on the private network 106) can establish a connection with a server 116 (an endpoint on the public network), which can be a web server that the wireless client 100 can access to retrieve information. The server 116 can also maintain a state of the connection between the wireless client 100 and the server 116 so that resources can be allocated to the connection between the server 116 and the wireless client 100 by the server 116. The public network 112 can include other routers that also are stateful intermediate devices.

In accordance with some embodiments of the invention, the connection that can be established between the wireless client 100 and the server 116 is a Transmission Control Protocol (TCP) connection. TCP is described in RFC 793, entitled, "Transmission Control Protocol," dated September 1981. TCP defines a transport layer in each of the network devices to enable such network devices to establish TCP connections over a data network. As used here, the term "data network" refers to one network or a collection of networks (such as the private network 106 and the public network 112 depicted in FIG. 1). The term "data network" also refers to any intermediate devices, such as routers, gateways, and the like, that enable communication between network elements. Also, a "network path" refers to a path through the data network between network elements. A path includes one or more portions of a data network, including routers and other elements that are used for a communications session between network elements. Note that in a packet-switched network, such as an IP network, packets communicated between network elements can travel over multiple different routes. Such multiple routes are considered to be part of a network path between network elements.

In other embodiments, instead of establishing TCP connections, other types of connections (according to other transport protocols) can be established. States for such other types of connections are also maintained by stateful intermediate devices. As used here, a "connection" refers to any communications session set up between two or more endpoints. The connection can be established through intermediate network(s) and stateful intermediate devices such as the firewall system 110, NAT router 114, and server 116.

An issue associated with a connection established with the wireless client 100 is that the wireless link 104 between the wireless client 100 and the wireless edge device 102 may be lost. To address this, the wireless edge device 102 according to some embodiments reports the lost wireless link to the firewall system 110. The firewall system 110 transitions to a special state that indicates that the connection to the wireless client 100 is potentially terminated. While in this state, the firewall system is able to properly handle subsequent data or connection requests received from the wireless client 100 so that the wireless client 100 is not denied access to the public network 112.

As further shown in FIG. 1, the wireless client 100 includes a wireless link layer 120 that enables the wireless client 100 to communicate over the wireless link 104 with a wireless link layer 122 in the wireless edge device 102. The wireless link layer 120 and the wireless link layer 122 exchange link layer (or layer-1) signaling over the wireless link 104.

The wireless client 100 also includes a TCP/IP stack 124 to enable communication of TCP/IP packets between the wireless client 100 and another endpoint. In some implementations, a simplified TCP/IP stack is used in the wireless client 100 due to the relatively limited resources (such as processing or storage resources) available in the wireless client 100. Such a simplified TCP/IP stack has a reduced set of TCP ports available that can be employed by the network client 100 in TCP connections established over a data network.

The wireless client 100 also includes an application software module 126 that provides the various capabilities of the wireless client 100.

The wireless edge device 102 includes a wireless link monitor module 128 that monitors the wireless link 104 between the wireless client 100 and the wireless edge device 102. The wireless link monitor module 128 can detect for loss of the wireless link 104 (which can result from weak signaling or the wireless client 100 moving out of range). The wireless link monitor 128 sends reports of wireless link losses to the firewall system 110. One technique for reporting lost wireless link connections is by use of Simple Network Management Protocol (SNMP) messages, such as an SNMP Trap message. SNMP is described in RFC 1067, entitled "A Simple Network Management Protocol," dated August 1988. SNMP provides for internetwork management such that various management functions can be provided. In accordance with some embodiments of the invention, one management function that can be provided by use of SNMP messages is the reporting of lost wireless links between the wireless edge device 102 and wireless clients, such as the wireless client 100.

Communication between the wireless edge device 102 and the firewall system 110 is provided through a link layer 130 (which can be an Ethernet layer, for example).

The firewall system 110 similarly includes a link layer 132 to communicate over the private network 106. Above the link layer 132 is a TCP/IP stack 134. The TCP/IP stack 134 maintains states of connections (TCP connections) between network elements coupled to the private network 106 and network elements coupled to the public network 112. The states of the various connections are maintained in state table 136, which can be stored in a storage 138 in the firewall system. The firewall system 110 also includes a firewall module 140 to provide firewall security tasks.

Each of the firewall system 110, wireless edge device 102, and wireless client 100 includes a processor 142, 148, and 144, respectively. Each processor 142, 148, and 144 is coupled to a respective storage 138, 150, and 146. Software modules in each of the firewall system 110, wireless edge device 102, and wireless client 100 are executable on a respective processor.

The firewall system 110 maintains a state table 136 in the storage 138. The state table 136 contains states of each connection that passes through the firewall system. State information 154 is also stored in a storage 152 of the NAT router, and state information 158 is stored in a storage 156 in the server 116. As noted above, routers (not shown) in the public network 112 can also be stateful intermediate devices that store state information.

Figure 2:
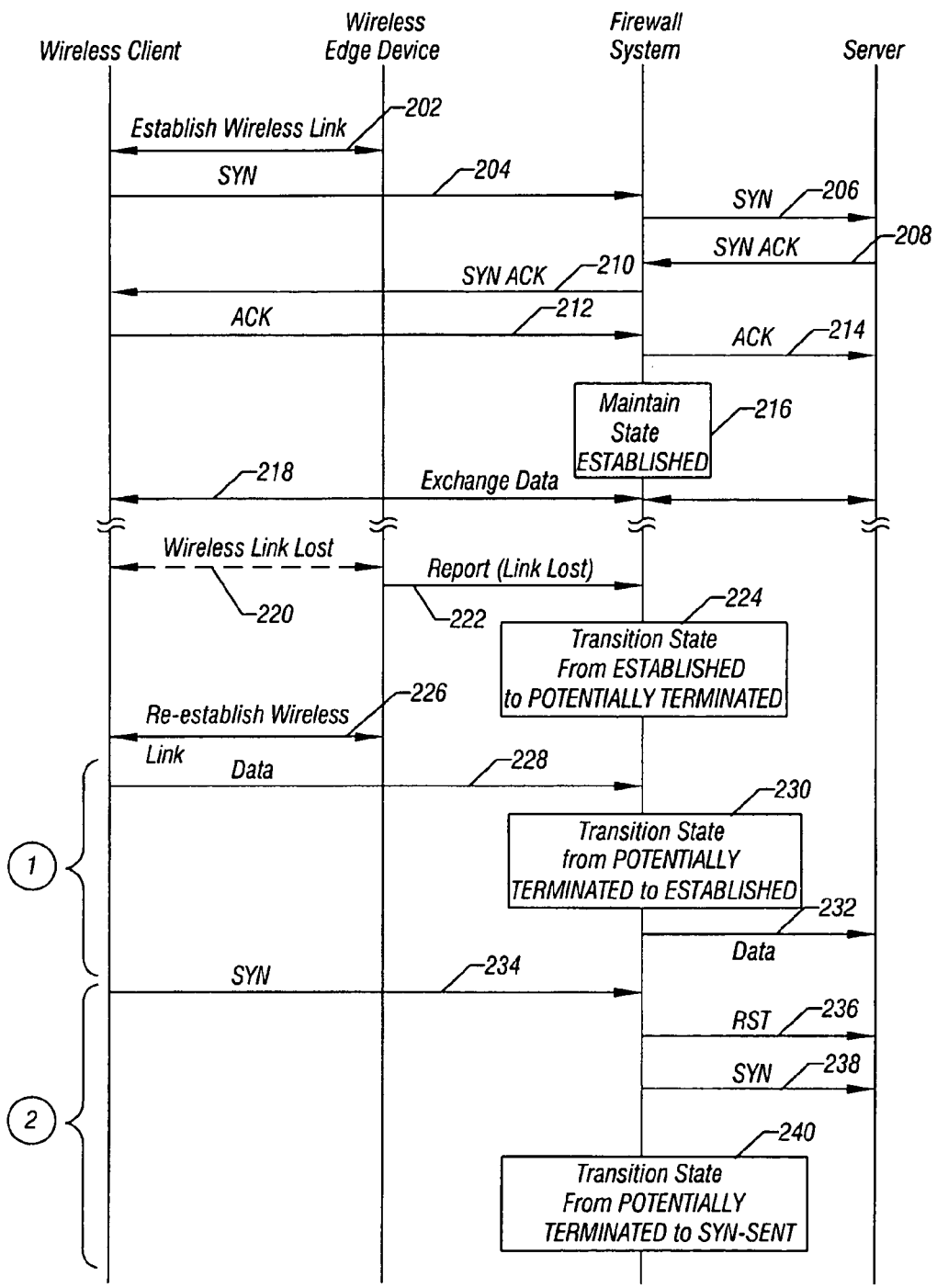
FIG. 2 is a flow diagram of a process of establishing a connection in the communications network, in accordance with an embodiment of the invention.

FIG. 2 is a message flow diagram of a process of communicating between the wireless client 100 and the server 116, in accordance with some embodiments of the invention. The wireless client 100 first establishes a wireless link (at 202) with the wireless edge device 102. The wireless client 100 then sends (at 204) a TCP SYN packet to the firewall system 110. The SYN packet is an IP packet that contains a TCP segment in which the SYN control bit is set. The SYN packet is a connection request (for a connection between the wireless client 100 and the server 116) sent by the wireless client 100 to the firewall system 110. The SYN packet contains a source port (the TCP port number for the wireless client 100) and a destination port (a TCP port number for the destination server 116). The SYN packet also contains source and destination IP addresses.

The firewall system 110 forwards (at 206) the SYN packet to the server 116. To acknowledge the SYN packet, the server 116 responds with a SYN ACK packet (at 208), which is received by the firewall system 110. The firewall system 110 allows the SYN ACK packet to pass through the firewall system 110, with the SYN ACK packet forwarded (at 210) to the wireless client 100. In response, the wireless client 100 sends (at 212) an acknowledgement, in the form of an ACK packet to the firewall system 110, which forwards the ACK packet (at 214) to the server 116. At this stage, the connection between the client 100 and server 116 has been established, and the firewall system 110 sets (at 216) the state of the TCP connection as being the ESTABLISHED state. This state information is kept in the state table 136 (FIG. 1) of the firewall system 110. The other states of the firewall system include: SYN-SENT, SYN-RECEIVED, FIN-WAIT-1, FIN-WAIT-2, CLOSE-WAIT, CLOSING, LAST-ACK, and TIME-WAIT. The SYN-SENT state indicates that an entity is waiting for a matching connection request after having sent a connection request. The SYN-RECEIVED state indicates that an entity is waiting for a confirming connection request acknowledgement after having both received and sent a connection request. The ESTABLISHED state indicates an open connection exists where data can be received and delivered. The FIN-WAIT-1, FIN-WAIT-2, CLOSE-WAIT, CLOSING, AND LAST-ACK states represent various states associated with terminating a connection.

The state table 136 (FIG. 1) in the firewall system 110 maintains the states of multiple connections between different groups of endpoints. The endpoints are identified by source and destination port numbers.

While the wireless client 100 and server 116 are exchanging the SYN, SYN-ACK, and ACK packets, the firewall system 110 transitions the state of the connection between the client 100 and server 116 from SYN-SENT to SYN-RECEIVED to ESTABLISHED. After the connection is established, data can be exchanged (at 218) between the wireless client 100 and the server 116. Note that the other stateful intermediate devices in the path from the client 100 to the server 116 also perform similar transitions among the various TCP states.

At some point, the wireless link between the wireless client 100 and the wireless edge device 102 may be lost (at 220), such as due to weak signal or the wireless client 100 moving out of range. Once the wireless link 104 monitor module 128 in the wireless edge device 102 detects the lost wireless link with the wireless client 100, the wireless link monitor module 128 sends (at 222) a report indicating a lost link to the firewall system 110. In response to this report, the firewall system 110 transitions (at 224) the state of the TCP connection from the ESTABLISHED state to a "POTENTIALLY TERMINATED" state. The POTENTIALLY TERMINATED state refers to a state in which the firewall system 110 indicates that the connection between the wireless client 100 and the server 116 may be terminated, although the firewall system 110 at this stage is not certain. This allows the firewall system 110 to wait for subsequent communications from the wireless client 100 (if any) to determine what further actions are to be taken.

A wireless link can be re-established (at 226) between the wireless client 100 and the wireless edge device 102 at some later point in time. When this occurs, two scenarios may be presented. A first scenario (scenario 1) involves the wireless client 100 sending data (without issuing a new connection request). This data is sent (at 228) by the wireless client 100 to the firewall system 110. When the firewall system 110 receives this data from the wireless client 100, the firewall system 110 transitions (at 230) the state of the TCP connection from the POTENTIALLY TERMINATED state to the ESTABLISHED state, if the received data is valid data. Valid data includes data packets having sequence numbers within an expected range. If the received data packets are invalid (the sequence numbers of the received packets do not match expected values), then the received data packets are discarded and the firewall system maintains the state of the connection in the POTENTIALLY TERMINATED state.

Valid data is then forwarded (at 232) from the firewall system 110 to the server 116, and further communication can occur between the wireless client 100 and the server 116. In scenario 1, the firewall system 100 is able to transition to the ESTABLISHED state in response to further valid data being sent by the wireless client 100. No additional messaging is needed in this scenario. The connection is thus treated as if the connection was never lost.

In a second scenario (scenario 2), the wireless client 100 sends a new connection request in response to re-establishing the wireless link (at 226). This new connection request is in the form of a SYN packet that is sent (at 234) to the firewall system 110.

The new connection request indicated by the SYN packet is likely to contain the same source port number as the previously used source port number (for establishing the connection at 218). The reusing of the same source port number is likely because the TCP/IP stack 124 (FIG. 1) is a simplified stack (for more efficient use of limited resources of the wireless client 100). As a result, the range of available source port numbers is relatively limited. Furthermore, the DHCP server 108 may also assign the same IP address to another wireless client. This other wireless client that is assigned the same IP address may also send the new connection request containing the same port number.

Conventionally, if the firewall system 110 receives a SYN packet containing a source port/destination port combination that is the same as that for a connection indicated as being ESTABLISHED, such a SYN packet is dropped as not being allowed. In accordance with some embodiments of the invention, rather than drop this new connection request, the firewall system 110 is able to detect that the connection request comes from a wireless client 100 associated with a connection state that is in the POTENTIALLY TERMINATED state. In this case, the firewall system 110 clears the old connection (since the old connection is no longer valid) and establishes a new connection.

However, note that downstream network elements (such as the NAT router 114 and the server 116) may also contain state information pertaining to the TCP connection between the network client 100 and the server 116. Before the firewall system 110 can establish a new connection, the firewall system first clears the states in the NAT router 114 and the server 116 (and any other stateful intermediate devices in the network path). This is accomplished by the firewall system 110 sending (at 236) an RST packet (which is a reset message) over the path to the server 116. The RST packet causes the state of the TCP connection to be reset. Following reset, the firewall system 110 forwards (at 238) the SYN packet to the server 116. The TCP state is also changed (at 240) from the POTENTIALLY TERMINATED state to the SYN-SENT state.

The acts following SYN (at 238) performed by the wireless client 100, firewall system 110, and server 116 are the same as acts 206-218 for establishing a connection.

In an alternative embodiment, the wireless edge device 102 and the firewall system 110 may not be configured to allow the wireless edge device 102 to report lost wireless links to the firewall system 110. In such an alternative embodiment, to detect for a lost wireless link, a SYN-reuse timeout period is set. The SYN-reuse timeout period is smaller than the 30-minute to 1-hour timeout used by a typical stateful intermediate device to drop a TCP connection. After the firewall system 110 detects that a particular TCP connection has been idle for a period that exceeds the SYN-reuse timeout period, the firewall system 110 sets the TCP state of the connection to the POTENTIALLY TERMINATED state if certain other criteria are satisfied. Such other criteria include a predefined IP address range associated with certain endpoints, such as wireless clients that are likely to lose wireless links. Also, the other criteria include IP address identifiers of an ingress/egress interface of the stateful intermediate device for traffic from and to the wireless clients. The ingress/egress interface is the interface used by the wireless clients to establish connections with endpoints on the public network. A further criterion that can be defined is the TCP protocol that is used. Thus, a connection that involves an endpoint in the configured IP address range and/or using the predefined ingress/egress interface and using the predefined TCP protocol will be marked POTENTIALLY TERMINATED after being idle for a period exceeding the SYN-reuse timeout period. The procedure following transitioning of the connection to the POTENTIALLY TERMINATED state includes the same acts 226-240 depicted in FIG. 2.

Instructions of the various software modules discussed herein are loaded for execution on corresponding control units or processors, such as a processor 142, 144, and 148 (FIG. 1). Processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules) are stored in one or more machine-readable storage media, such as storage 138, 146, or 150 (FIG. 1). The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system or device in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for establishing a connection between a wireless device and a second device, comprising:

maintaining a state of the connection between the wireless device and the second device;

receiving an indication that a wireless link to the wireless device has been lost;

in response to receiving the indication that the wireless link to the wireless device has been lost, transitioning the state of the connection from an established state to a second state, the second state indicating that the connection is potentially terminated, and the second state different from a third state indicating termination of the connection;

storing a state table having plural entries for corresponding plural connections, wherein one of the plural entries is for the connection between the wireless device and the second device; and indicating the state of the connection between the wireless device and the second device with the one entry in the state table, wherein transitioning the state of the connection comprises modifying the one entry in the state table.

2. The method of claim 1, wherein the maintaining, receiving, transitioning, storing, and indicating acts are performed by an intermediate device between the wireless device and the second device, and wherein the state table is stored in the intermediate device, the method further comprising:
- while the connection is in the second state, the intermediate device receiving data from the wireless device;
- in response to receiving the data, transitioning, in the intermediate device, the state of the connection from the second state to the established state by modifying the one entry in the state table.

3. The method of claim 2, wherein transitioning the state from the established state to the second state comprises transitioning the state of the connection from a Transmission Control Protocol (TCP) ESTABLISHED state to a second TCP state in response to receiving the indication that the wireless link to the wireless device has been lost.

4. The method of claim 1, further comprising:
- while the connection is in the second state, the intermediate device receiving a connection request from the wireless device; and
- in response to receiving the connection request from the wireless device, the intermediate device sending a reset message over a path to the second device to reset a state in each of one or more stateful intermediate devices in the path.

5. The method of claim 4, further comprising transitioning, in the intermediate device, the state of the connection to another state in response to the connection request.

6. The method of claim 4, wherein sending the reset message in response to the connection request comprises sending the reset message in response to a Transmission Control Protocol (TCP) SYN packet.

7. The method of claim 1, wherein receiving the indication comprises receiving the indication that the wireless link has been lost from a wireless edge device.

8. The method of claim 1, wherein the maintaining, receiving, transitioning, storing, and indicating acts are performed by a firewall system.

9. An article comprising at least one non-transitory storage medium containing instructions that when executed cause an intermediate device to:
- maintain a state of a Transmission Control Protocol (TCP) connection between a wireless device and a second device, wherein maintaining the state comprises maintaining the state in a particular entry of a state table storing plural entries containing TCP states for respective connections that pass through the intermediate device;
- receive an indication that a wireless link to the wireless device may be lost; and
- in response to receiving the indication that the wireless link to wireless device may be lost, transition the state of the TCP connection from a TCP established state to a second TCP state by modifying the particular entry of the state table, the second TCP state indicating that the connection is potentially terminated, and the second TCP state different from a third TCP state indicating termination of the TCP connection.

10. The article of claim 9, wherein receiving the indication that the wireless link to the wireless device may be lost is in response to detecting that the TCP connection has been idle for greater than a predefined time period.

11. The article of claim 9, wherein receiving the indication that the wireless link to the wireless device may be lost comprises receiving the indication from a wireless edge device to which the wireless device has established a wireless link.

12. The article of claim 9, wherein the instructions when executed cause the intermediate device to further:
- while the connection is in the second TCP state, receive a connection request from the wireless device; and
- in response to receiving the connection request from the wireless device, send a TCP reset message over a path to the second device to reset a state of each of one or more stateful intermediate devices in the path.

13. The article of claim 12, wherein the instructions when executed cause the intermediate device to further:
- transition the state of the connection to another TCP state in response to the connection request, the another TCP state indicating that the system is awaiting receipt of a message to establish the connection.

14. The article of claim 13, wherein transitioning the connection to the another TCP state comprises transitioning the connection to a TCP SYN-SENT state.

15. An intermediate device comprising:
- a storage to store a state table containing Transmission Control Protocol (TCP) state information pertaining to a connection between a wireless device and a second device, the connection established through the intermediate device; and
- one or more processors to:
  - maintain a state of the connection between the wireless device and the second device,
  - receive an indication that a wireless link to the wireless device has been lost, and
  - in response to receiving the indication that the wireless link to the wireless device has been lost, update the state table to transition the state of the connection from an established state to a second state that indicates that the connection is potentially terminated, wherein the second state is different from a third state indicating termination of the connection.

16. The intermediate device of claim 15, wherein the one or more processors are configured to further:
- while the connection is in the second state, receive a connection request from the wireless device, and
- in response to receiving the connection request from the wireless device, terminate the connection and establish a new connection.

17. The intermediate device of claim 16, wherein the one or more processors are configured to further:
- prior to establishing the new connection, send a reset message over a path to the second device to reset a state of each of one or more stateful intermediate devices in the path.

18. The intermediate device of claim 17, wherein the one or more processors are configured to further:
- send a connection request to the second device to establish the new connection.

19. The intermediate device of claim 15, wherein the one or more processors are configured to further:
- while the connection is in the second state, receive valid data from the wireless device, and
- in response to receiving the valid data from the wireless device, transition the state of the connection from the second state to the established state.

20. The intermediate device of claim 15, wherein the connection comprises a TCP connection, and the first and second states comprises first and second TCP states.

21. A method for establishing a connection between a wireless device and a second device, comprising: maintaining, in a state table, a state of the connection between the wireless device and the second device, wherein the state table is to store Transmission Control Protocol (TCP) state information;

receiving an indication that a wireless link to the wireless device has been lost; and in response to receiving the indication that the wireless link to the wireless device has been lost, transitioning the state of the connection from a first state to a second state by updating the state table, where the second state indicates that the wireless link is potentially terminated, the second state being different from a third state indicating termination of the wireless link, wherein the connection comprises a TCP connection, and wherein the first and second states comprises first and second TCP states, and wherein the maintaining, receiving, and transitioning acts are performed by an intermediate device, the method further comprising:

while the TCP connection is in the second TCP state, the intermediate device receiving data packets having sequence numbers from the wireless device; and in response to the intermediate device receiving the data packets having sequence numbers within an expected range, transitioning the state of the TCP connection from the second TCP state to the first TCP state.

22. The method of claim 21, further comprising:

in response to the intermediate device receiving data packets having sequence numbers outside the expected range, discarding the received data packets and maintaining the state of the TCP connection in the second TCP state.

23. An article comprising at least one non-transitory storage medium containing instructions that when executed cause a system to:

maintain, in a state table, a state of a Transmission Control Protocol (TCP) connection between a wireless device and a second device;

receive an indication that a wireless link to the wireless device may be lost;

in response to receiving the indication that the wireless link to wireless device may be lost, update the state table to transition the state of the TCP connection from a first TCP state to a second TCP state, where the second TCP state indicates that the wireless link is potentially terminated, the second TCP state being different from a third TCP state indicating termination of the wireless link; and transition the state of the TCP connection from the second TCP state to the first TCP state in response to receiving valid data from the wireless device.

24. The article of claim 23, wherein receiving the valid data comprises receiving at least one data packet having a sequence number within an expected range.

\* \* \* \* \*